US012764238B2

(12) United States Patent
Yamamoto et al.

(10) Patent No.: US 12,764,238 B2
(45) Date of Patent: Oct. 13, 2026

(54) PRINT CONTROL DEVICE, PRINT CONTROL METHOD, AND NON-TRANSITORY COMPUTER-READABLE STORAGE MEDIUM STORING PROGRAM

(71) Applicant: SEIKO EPSON CORPORATION, Tokyo (JP)

(72) Inventors: Kohei Yamamoto, Matsumoto (JP); Takashi Sera, Shiojiri (JP); Masayuki Kobayashi, Fujimi-machi (JP); Katsuhito Kitahara, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 221 days.

(21) Appl. No.: 18/802,467

(22) Filed: Aug. 13, 2024

(65) Prior Publication Data

US 2025/0063122 A1 Feb. 20, 2025

(30) Foreign Application Priority Data

Aug. 16, 2023 (JP) ................................ 2023-132420

(51) Int. Cl.
*H04N 1/00* (2006.01)
*H04L 51/046* (2022.01)

(52) U.S. Cl.
CPC ....... *H04N 1/00212* (2013.01); *H04L 51/046* (2013.01)

(58) Field of Classification Search
CPC .......................... H04N 1/00212; G06F 3/1243
See application file for complete search history.

(56) References Cited

U.S. PATENT DOCUMENTS

| | | | | |
|---|---|---|---|---|
| 8,453,041 | B2 * | 5/2013 | Henderson, Jr. | G06F 11/10 341/51 |
| 10,817,584 | B2 * | 10/2020 | Singh | G06F 16/9554 |
| 2013/0132599 | A1 * | 5/2013 | Nakashima | G06F 9/54 709/230 |
| 2020/0210125 | A1 | 7/2020 | Hakamata | |
| 2023/0208876 | A1 * | 6/2023 | Jung | H04L 63/1441 726/23 |

FOREIGN PATENT DOCUMENTS

JP 2020107128 A 10/2020

* cited by examiner

*Primary Examiner* — Benjamin O Dulaney
(74) *Attorney, Agent, or Firm* — WORKMAN NYDEGGER

(57) ABSTRACT

A print control device includes: a post acquisition unit configured to acquire a first URL posted in a chat room; a file acquisition unit configured to acquire a file; an encode processing unit configured to encode an encodable character; and a print control unit configured to cause an image forming device to execute printing of the acquired file, wherein the encode processing unit encodes an encodable character except a predetermined character in a character string of the first URL, and the file acquisition unit acquires a file indicated by a second URL formed by encoding the encodable character except the predetermined character in the character string of the first URL.

8 Claims, 9 Drawing Sheets

FIG. 4E https://www.abc.com/half+full%E3%80%80日本語.pdf

FIG. 5A https://www.abc.com/plus+日本語.pdf

C4 C5

FIG. 5B https://www.abc.com/plus+%E6%97%A5%E6%9C%AC%E8%AA%9E.pdf

C4 E5

FIG. 5C

PRINT CONTROL DEVICE, PRINT CONTROL METHOD, AND NON-TRANSITORY COMPUTER-READABLE STORAGE MEDIUM STORING PROGRAM

The present application is based on, and claims priority from JP Application Serial Number 2023-132420, filed Aug. 16, 2023, the disclosure of which is hereby incorporated by reference herein in its entirety.

BACKGROUND

1. Technical Field

The present disclosure relates to a print control device, a print control method, and a non-transitory computer-readable storage medium storing a program.

2. Related Art

Recently, a chat service in which a message or the like is posted is in widespread use. Also, a chatbot that responds to a post from a user is known. In a system disclosed in JP-A-2020-107128, when a user posts on a chat a uniform resource locator (URL) related to a file to be printed, the chatbot acquires the corresponding file based on this URL and performs processing to print the corresponding file.

JP-A-2020-107128 is an example of the related art.

In the system disclosed in JP-A-2020-107128, a file indicated by a posted URL is printed. However, when the user posts a URL on the chat, a character string that is not properly URL-encoded may be posted as a URL. In this case, a file to be printed cannot be acquired and therefore the file cannot be printed and the convenience for the user is lowered.

SUMMARY

According to an aspect of the present disclosure, a print control device includes: a post acquisition unit configured to acquire a first URL posted in a chat room; a file acquisition unit configured to acquire a file; an encode processing unit configured to encode an encodable character; and a print control unit configured to cause an image forming device to execute printing of the acquired file, wherein the encode processing unit encodes an encodable character except a predetermined character in a character string of the first URL when the file acquisition unit cannot acquire a file indicated by the first URL, and the file acquisition unit acquires a file indicated by a second URL formed by encoding the encodable character except the predetermined character in the character string of the first URL, when unable to acquire the file indicated by the first URL.

According to another aspect of the present disclosure, a print control method includes: acquiring a first URL posted in a chat room; acquiring a file; encoding an encodable character; and causing an image forming device to execute printing of the acquired file, wherein an encodable character except a predetermined character in a character string of the first URL is encoded when a file indicated by the first URL cannot be acquired, and a file indicated by a second URL formed by encoding the encodable character except the predetermined character in the character string of the first URL is acquired when the file indicated by the first URL cannot be acquired.

According to still another aspect of the present disclosure, a non-transitory computer-readable storage medium storing a program is provided, the program causing a computer to execute: acquiring a first URL posted in a chat room; acquiring a file; encoding an encodable character; and causing an image forming device to execute printing of the acquired file, wherein in the encoding, an encodable character except a predetermined character in a character string of the first URL is encoded when a file indicated by the first URL cannot be acquired in the acquiring the file, and in the acquiring the file, a file indicated by a second URL formed by encoding the encodable character except the predetermined character in the character string of the first URL is acquired when the file indicated by the first URL cannot be acquired.

BRIEF DESCRIPTION OF THE DRAWINGS

FIG. 4E shows a character string formed by decoding an URL on which the encode processing according to the comparative example is performed.

FIG. 5A shows a character string of a URL related to a file and not URL-encoded.

FIG. 5B shows an example of a processing result of first encode processing.

FIG. 5C shows a character string formed by decoding the processing result of the first encode processing.

DESCRIPTION OF EMBODIMENTS

Figure 1:
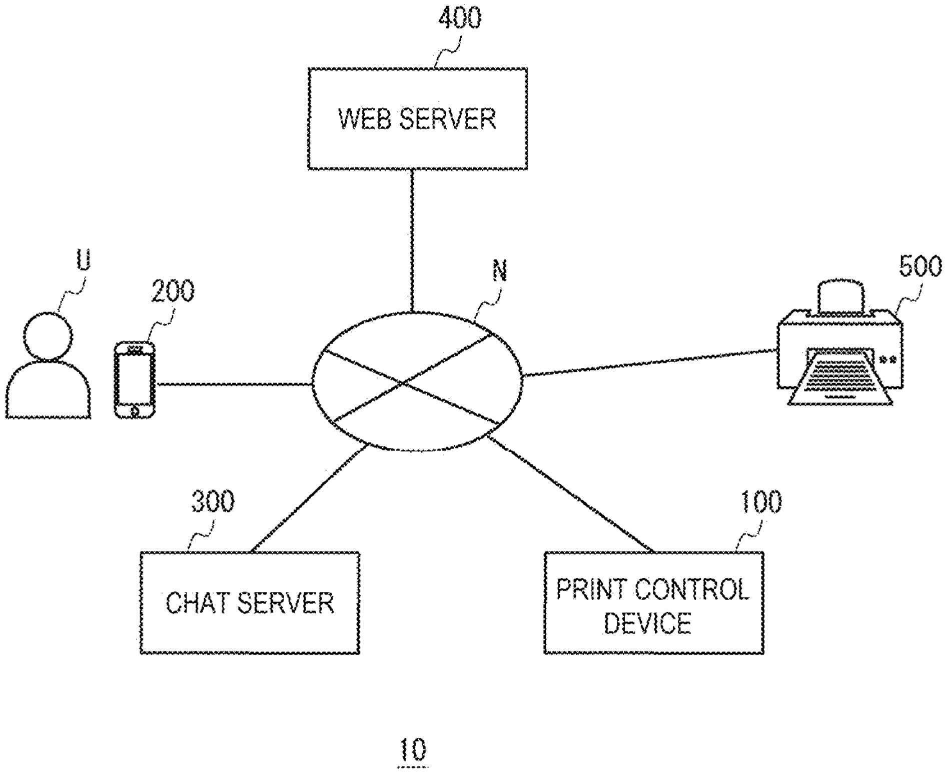
FIG. 1 is a block diagram showing an example of the configuration of an information processing system according to an embodiment.

An embodiment will now be explained with reference to the drawings. To clarify the explanation, an omission or simplification is made in the description and drawings given below, where appropriate. In the drawings, the same elements are denoted by the same reference sign and a repeated description thereof is omitted where appropriate.

FIG. 1 is a block diagram showing an example of the configuration of an information processing system 10 according to an embodiment. In the example shown in FIG. 1, the information processing system 10 includes a terminal device 200, a chat server 300, a web server 400, a print control device 100, and an image forming device 500. The terminal device 200, the chat server 300, the web server 400, the print control device 100, and the image forming device 500 are connected to a network N such as the internet.

In this embodiment, the terminal device 200 is communicably connected at least to the chat server 300. The print control device 100 is communicably connected at least to the chat server 300, the web server 400, and the image forming device 500.

The terminal device 200 is a device operated by a user U and is, for example, a smartphone, a tablet terminal, a personal computer or the like. In the terminal device 200, application software (also referred to as a chat app) to use a chat service provided by the chat server 300 is installed. The user U is a user having an account to use the chat service and can use the chat service, using the terminal device 200. The account includes identification information to identify the user, and other information associated with the identification information. Specifically, for example, the account includes a password or the like in addition to a user ID. In the terminal device 200, a browser to view a file in the web server 400 may be installed. While one terminal device 200 and one user U are illustrated in FIG. 1, a plurality of users may use the information processing system 10. Therefore, the information processing system 10 may include a plurality of terminal devices 200.

The chat server 300 is a server that provides a chat service. The chat server 300 may be formed of a plurality of servers. The chat service enables members participating in the same chat room to place a post and thus chat among the members. The chat room is a virtual place where the members exchange posts. The chat room is also referred to as a talk room, a channel, or a workspace.

The print control device 100 is a device that functions as a chatbot. The chatbot is a software robot that receives data posted in the chat service and performs processing corresponding to the data. The print control device 100 has an account to use the chat service and participates as a member in the chat room in which the user U participates as a member. In this embodiment, the print control device 100 performs processing to cause the image forming device 500 to print a file designated by a post placed by the user U, as will be described later. The print control device 100 is, for example, a server, but is not limited to the server and may be any device having functions of a computer. The print control device 100 may be formed of a plurality of computers (a plurality of servers).

The web server 400 is a server storing any file that can be a file to be printed. The web server 400 may be a cloud storage. In this embodiment, the print control device 100 acquires a file to be printed from the web server 400, using a URL posted in the chat room.

The image forming device 500 is a device having a function of performing print processing and is specifically, for example, a printer. The image forming device 500 is registered in advance in the print control device 100 as an image forming device to be used for printing. While one image forming device 500 is illustrated in FIG. 1, a plurality of image forming devices 500 may be registered in the print control device 100 as image forming devices available for printing. For example, in the print control device 100, an image forming device 500 may be registered for each user U. In this embodiment, the print control device 100 causes the image forming device 500 associated with the account of the user U to print a file acquired based on a URL posted in the chat room by the user U.

Figure 2:
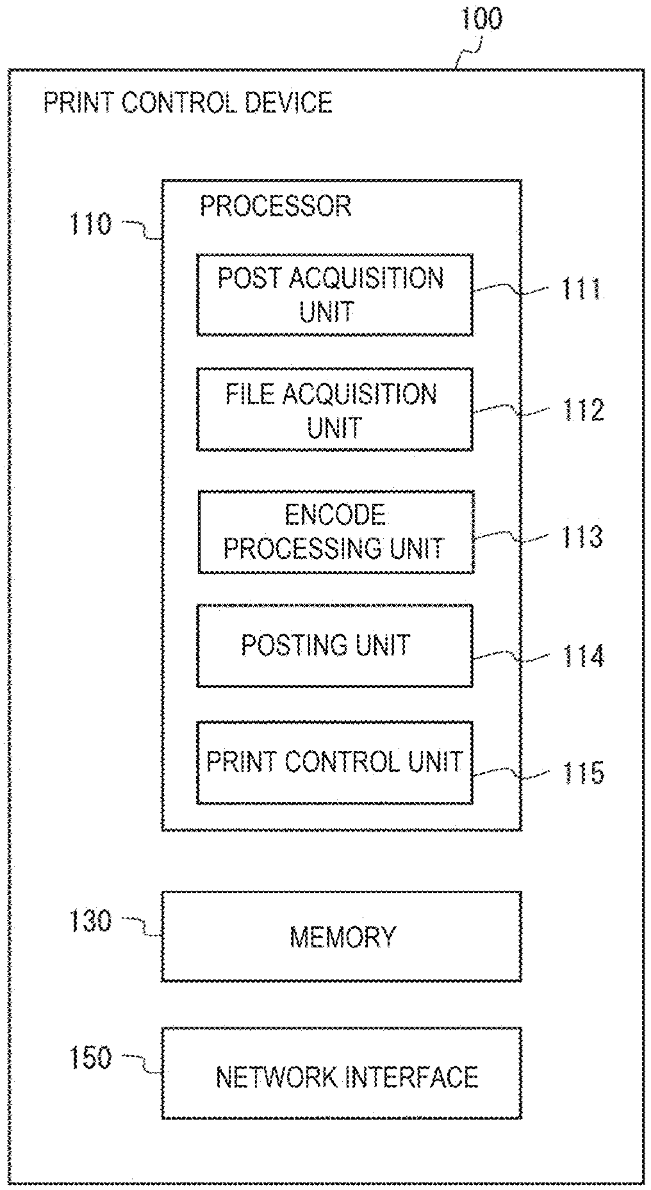
FIG. 2 is a block diagram showing an example of the configuration of a print control device according to the embodiment.

A specific configuration of and processing by the print control device 100 will now be described. FIG. 2 is a block diagram showing an example of the configuration of the print control device 100. As shown in FIG. 2, the print control device 100 has a processor 110, a memory 130, and a network interface 150. In this way, the print control device 100 has functions of a computer.

The network interface 150 is used for communication via the network N. The network interface 150 may include, for example, a network interface card (NIC).

The memory 130 is formed of, for example, a combination of a volatile memory and a nonvolatile memory. The memory 130 is used to store a program executed by the processor 110 and data or the like used for various processing.

The processor 110 reads out and executes a program from the memory 130. The processor 110 thus implements functions of a post acquisition unit 111, a file acquisition unit 112, an encode processing unit 113, a posting unit 114, and a print control unit 115, which will be described later. The processor 110 may be, for example, a microprocessor, a microprocessor unit (MPU), or a central processing unit (CPU) or the like. The processor 110 may include a plurality of processors.

The program includes a command set (or software code) to cause a computer to execute one or more functions described in the embodiment, when read by the computer. The program may be stored in a non-transitory computer-readable medium or a tangible storage medium. The computer-readable medium or the tangible storage medium includes, as an example but not limited to, a random-access memory (RAM), a read-only memory (ROM), a flash memory, a solid-state drive (SSD) or other memory techniques, a CD-ROM, a digital versatile disc (DVD), a Blu-ray (trademark registered) disc or other optical disc storages, a magnetic cassette, a magnetic tape, a magnetic disk storage or other magnetic storage devices. The program may be transmitted on a transitory computer-readable medium or a communication medium. The transitory computer-readable medium or the communication medium includes, as an example but not limited to, electrical, optical, acoustic or other forms of propagation signals.

The post acquisition unit 111, the file acquisition unit 112, the encode processing unit 113, the posting unit 114, and the print control unit 115 will now be described.

The post acquisition unit 111 acquires data posted by the user U in the chat room in which the print control device 100 participates as a chatbot. More specifically, the data posted by the user U refers to data posted by the terminal device 200 in response to an operation by the user U in the chat room provided by the chat server 300. The post acquisition unit 111 acquires data posted in the chat room from the chat server 300. More specifically, the post acquisition unit 111 acquires data posted in the chat room and identification information of the user U posting this data, from the chat server 300. In this embodiment, in order to print a file existing in the web server 400, the user U posts the URL of the file in the chat room. Therefore, in this embodiment, in particular, the post acquisition unit 111 acquires the URL posted in the chat room. In the description below, the URL posted in the chat room is referred to as a first URL.

The user U copies and pastes, for example, a URL displayed via any application software operating in the terminal device 200 and thus posts the URL of the file to be printed, in the chat room. This application software (hereinafter referred to as an app) is, for example, a browser, but may be other software than the browser. In this case, the user U carries out to the terminal device 200 an operation of copying the URL displayed via the app operating in the terminal device 200 and subsequently carries out to the terminal device 200 an operation of pasting the copied URL into the chat room. The user U may also instruct any app operating in the terminal device 200 to share a URL and thus post the URL of the file to be printed, in the chat room. In this case, the user U carries out to the terminal device 200 an operation of designating the URL to be shared, an operation of giving an instruction to use a sharing function of the app operating in the terminal device 200, and an operation of designating the chat room as who to share the URL with. The user U may also input a character string representing the URL to the terminal device 200 and thus post the URL of the file to be printed, in the chat room.

Figure 3:
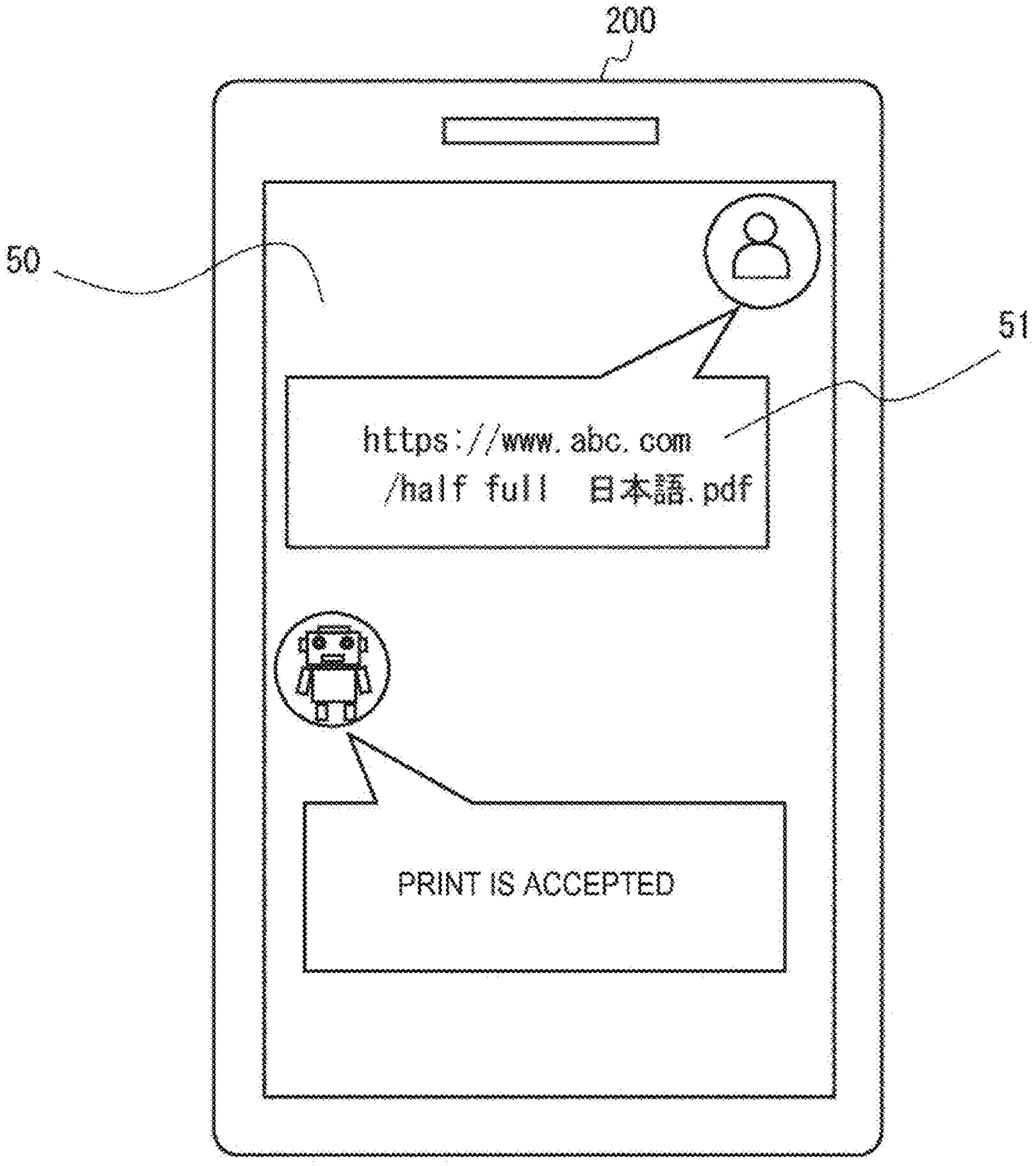
FIG. 3 is a schematic view showing an example of posting a URL in a chat room by a user.

FIG. 3 is a schematic view showing an example of posting a URL 51 in a chat room 50 by the user U. FIG. 3 shows the chat room 50 displayed on the terminal device 200 and the URL 51 posted therein. In the example shown in FIG. 3, the post acquisition unit 111 acquires the posted URL 51 via the chat server 300.

The file acquisition unit 112 acquires the file to be printed, based on the URL acquired by the post acquisition unit 111. Specifically, the file acquisition unit 112 acquires the file indicated by the URL acquired by the post acquisition unit 111 or a URL formed by modifying the character string of this URL. In this embodiment, the file acquisition unit 112 acquires the file indicated by the URL from the web server 400.

When the character string of the posted URL is a properly URL-encoded character string, the file acquisition unit 112 can acquire the file indicated by the URL represented by the posted character string. However, when the URL is posted by copy-and-paste or when the URL is posted using the sharing function of the app, a situation where the character string of the URL is posted in the state where a part or all of the characters that need URL-encoding are not URL-encoded may occur. This situation is considered to occur due to the specifications of the app such as the browser. When the URL-encoding of the character string of the posted URL is insufficient, the domain name, the path name, or the file name acquired when this character string is URL-decoded is wrong and therefore the file indicated by the URL made up of this character string cannot be acquired. To solve such a problem, the print control device 100 may perform processing of URL-encoding the character string of the posted URL when the acquisition of the file fails. However, when only a part of the characters that need URL-encoding is not URL-encoded, URL-encoding all the URL-encodable characters of the character string of the posted URL may generate a doubly URL-encoded character. That is, when the character string of the posted URL includes an already URL-encoded character and a character that should be URL-encoded but is not URL-encoded, the already URL-encoded character ends up being doubly URL-encoded. In this case, too, the acquisition of the file fails. That is, since the domain name, the path name, or the file name acquired when the doubly URL-encoded character string of the URL is URL-decoded is wrong, the file acquisition unit 112 cannot acquire the file to be printed. This embodiment solves such a problem. The description of the components of the print control device 100 continues below.

The encode processing unit 113 encodes an encodable character. Specifically, the encode processing unit 113 performs known URL-encoding of a URL-encodable character. The URL-encoding may be specifically, for example, percent-encoding or coding defined by url-standard, 5. application/x-www-form-urlencoded.

Particularly, when the file acquisition unit 112 cannot acquire the file indicated by the URL acquired by the post acquisition unit 111, that is, the foregoing first URL, the encode processing unit 113 encodes an encodable character except a predetermined character in the character string of the first URL. Hereinafter, this processing is also referred to as first encode processing. The URL formed by encoding the encodable character except the predetermined character in the character string of the first URL is referred to as a second URL. The foregoing predetermined character is referred to as an encode-on-hold character. The encode-on-hold character (foregoing predetermined character) is a character that may be doubly encoded when encoding is performed. That is, the encode-on-hold character is a character that may be doubly URL-encoded when URL-encoding is performed. More specifically, the encode-on-hold character refers to a character that is URL encodable and that can also emerge as a URL-encoded character. The URL encodable character can also be said to be a character for which the character conversion of the URL encoding is defined by the URL-encoding rules. In this embodiment, specifically, the two characters of "%" (half-width percent sign) and "+" (half-width plus sign) are used as the encode-on-hold character. Although only one of "%" and "+" may be used as the encode-on-hold character, preferably both "%" and "+" are used as the encode-on-hold character in order to properly acquire a file corresponding to any URL.

When such first encode processing is performed, encode processing is performed excluding the character that may be doubly encoded. Therefore, the already URL-encoded character can be prevented from being doubly URL-encoded. Thus, it can be expected that a properly URL-encoded character string is acquired. When the first encode processing is performed, the file acquisition unit 112 attempts to acquire the file indicated by the second URL. When the character string that is properly URL-encoded by the first encode processing is acquired, the file acquisition unit 112 succeeds in the acquisition of the file to be printed. In this way, in this embodiment, the file acquisition unit 112 acquires the file indicated by the second URL when unable to acquire the file indicated by the first URL. Thus, the file to be printed can be properly acquired.

Meanwhile, when the character excluded from the encoding targets in the first encode processing is a character that is not encoded yet, encode processing is performed excluding the character that should be encoded, in the first encode processing. That is, when the first URL includes "%" or "+", which does not emerge as a character formed by encoding a certain character, "%" or "+" is not URL-encoded in the first encode processing. Therefore, "%" or "+" is left in the second URL as a character yet to be encoded. In such a case, even when the second URL is decoded, a proper file name or the like cannot be acquired and therefore the file acquisition unit 112 fails in the acquisition of the file indicated by the second URL.

As such, when the file acquisition unit 112 cannot acquire the file indicated by the second URL, the encode processing unit 113 encodes the encode-on-hold character (foregoing predetermined character) in the character string of the second URL. That is, the encode processing unit 113 encodes the encode-on-hold character excluded from the targets of encode processing in the first encode processing. Hereinafter, this processing is also referred to as second encode processing. The URL formed by encoding the encode-on-hold character in the character string of the second URL is referred to as a third URL. Thus, in this embodiment, specifically, "%" and "+" included in the second URL are URL-encoded by the second encode processing. However, in order to prevent double URL-encoding in the second encode processing, preferably the encode processing unit 113 operates in the following manner. In the second encode processing, when a character string made up of the encode-on-hold character (foregoing predetermined character) and a character following this encode-on-hold character, included in the second URL, corresponds to a predetermined pattern, preferably the encode processing unit 113 does not encode the encode-on-hold character. For example, in percent-encoding, the characters to be encoded by URL-encoding are converted to characters such as "% XX" (where "X" represents a character used in hexadecimal numbers). That is, the characters to be encoded are in a character string pattern in which two characters used in hexadecimal numbers (that is, any one of "0" to "9" or any one of "A" to "F") come immediately after "%". Therefore, if such a character string pattern is encoded in the second encode processing, double encoding occurs. Therefore, when the second URL includes "%" but the character string made up of this "%" and the subsequent characters corresponds to the "% XX" pattern, the encode processing unit 113 does not URL-encode this "%". That is, when a character string used in hexadecimal numbers comes immediately after "%", the encode processing unit 113 does not URL-encode "%". In other words, in the second encode processing, when "%" included in the second URL does not correspond to the "% XX" pattern, the encode processing unit 113 URL-encodes this "%". In this way, as the targets of encoding in the second encode processing are limited, a file can be acquired more properly.

As the second encode processing is performed, encode processing is performed on the character that is not encoded in the first encode processing. Therefore, even when a file cannot be acquired due to the insufficiency of the URL-encoding of the character string in the second URL, a proper URL to acquire the file can be acquired. When the second encode processing is performed, the file acquisition unit 112 acquires the file indicated by the third URL. In this way, the file acquisition unit 112 acquires the file indicated by the third URL formed by encoding the foregoing predetermined character in the character string of the second URL, when unable to acquire the file indicated by the second URL. Thus, the file to be printed can be properly acquired.

The posting unit 114 posts data such as a message in the chat room in which the print control device 100 participates as a chatbot. Specifically, the posting unit 114 transmits data to be posted, to the chat server 300. Particularly, when the file acquisition unit 112 cannot acquire the file to be printed, the posting unit 114 posts error information in the chat room. In this embodiment, while the posting unit 114 posts the error information when the acquisition of the file indicated by the third URL fails as well, the posting unit 114 may also post the error information when the acquisition of the file indicated by the first URL fails or when the acquisition of the file indicated by the second URL fails. The posting unit 114 posts, for example, a message notifying the user U that the file cannot be acquired, as the error information. As the error information is posted in this way, the user can grasp the occurrence of an error and the convenience for the user is improved.

When the file acquisition unit 112 can acquire the file to be printed, the posting unit 114 posts the file name of the acquired file in the chat room. As the file name of the acquired file is posted in this way, the user can grasp that the processing is properly in progress and the convenience for the user is improved.

The print control unit 115 causes the image forming device 500 to execute the printing of the file acquired by the file acquisition unit 112. The print control unit 115 causes the image forming device 500 corresponding to the user posting the first URL to execute the printing of the acquired file. The print control unit 115 may cause the image forming device 500 to execute the printing via another device (for example, a server) that manages or controls the printing by the image forming device 500, instead of directly instructing the image forming device 500 to print.

Figure 4A:
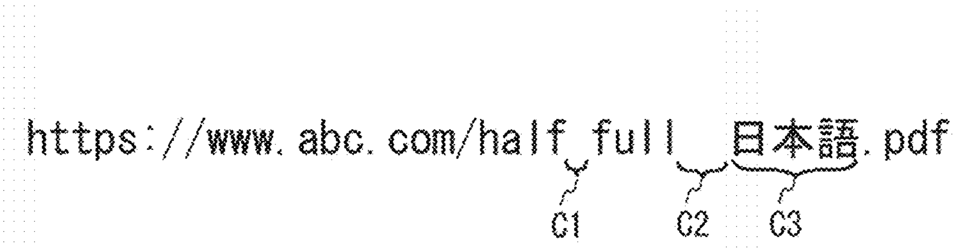
FIG. 4A shows a character string of a URL related to a file and not URL-encoded.
Figure 4B:
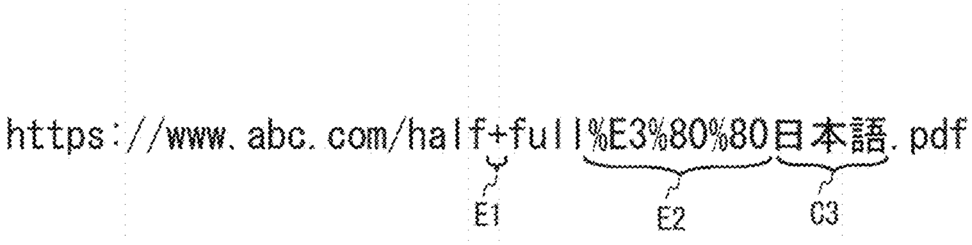
FIG. 4B shows an example of a URL posed in the chat room.

A specific example of the encode processing by the encode processing unit 113 will now be described. FIG. 4A shows a character string of a URL related to a file and not URL-encoded. The character string shown in FIG. 4A includes a character C1, a character C2, and a character string C3, as characters that need URL-encoding. Specifically, the character C1 is a half-width space, the character C2 is a full-width space, and the character string C3 is a character string expressed by Chinese characters. FIG. 4B shows an example of the URL posted in the chat room (that is, the foregoing first URL) and shows a character string formed by URL-encoding only a part of the character string shown in FIG. 4A. Specifically, only the character C1 and the character C2 shown in FIG. 4A are URL-encoded and the character string C3 is not URL-encoded. In FIG. 4B, a character E1 is a character formed by URL-encoding the character C1, and a character string E2 is a character string formed by URL-encoding the character C2.

Figure 4C:
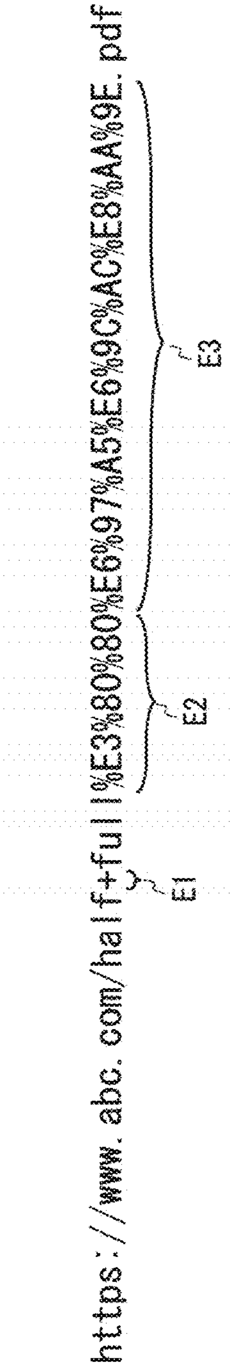
FIG. 4C shows an example of a processing result of first encode processing.

It is now assumed that the post acquisition unit 111 acquires the URL shown in FIG. 4B. In this case, since the character string C3 is not URL-encoded, the file acquisition unit 112 fails in the acquisition of the file using the character string of the URL shown in FIG. 4B. Therefore, the encode processing unit 113 carries out URL-encoding of the encodable characters except the encode-on-hold characters "%" and "+" in the character string shown in FIG. 4B. Thus, the character string C3 is URL-encoded to a character string E3 and a character string shown in FIG. 4C is acquired. In the character string shown in FIG. 4C, all of the character C1, the character C2, and the character string C3 are properly URL-encoded. Therefore, when the character string shown in FIG. 4C is decoded, the character string shown in FIG. 4A is acquired. Thus, when attempting to acquire the file, using the character string shown in FIG. 4C, the file acquisition unit 112 succeeds in the acquisition of the file.

Figure 4D:
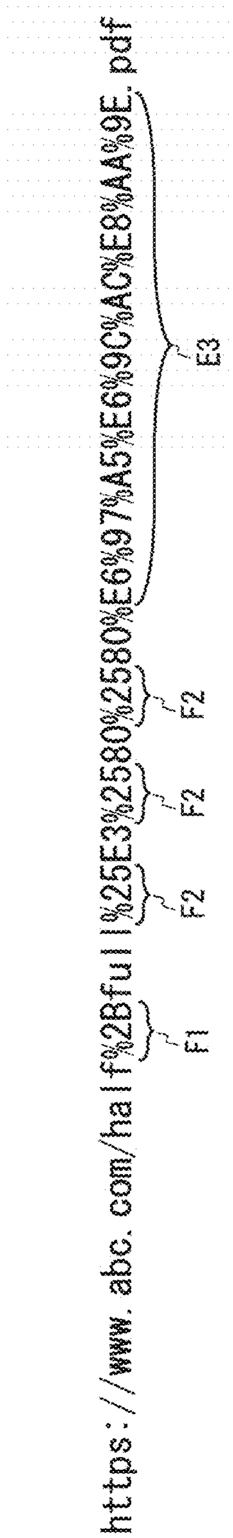
FIG. 4D shows an example of a processing result of encode processing according to a comparative example.

Meanwhile, FIG. 4D shows a character string formed when URL-encoding is carried out on all the encodable characters included in the character string shown in FIG. 4B. In this case, not only the character string C3 is URL-encoded to the character string E3 but also the character E1 (that is, "+") is URL-encoded again and converted to a character string F1 and "%" included in the character string E2 is URL-encoded again and converted to a character string F2. When the character string shown in FIG. 4D is decoded, a character string shown in FIG. 4E is acquired. This is different from the character string shown in FIG. 4A. Therefore, the file acquisition unit 112 fails in the acquisition of the file. In contrast, in this embodiment, since encode processing is performed on the characters except the encode-on-hold characters, as described above, the character string shown in FIG. 4C is acquired and the file can be acquired properly.

Another specific example of the encode processing by the encode processing unit 113 will now be described. FIG. 5A shows a character string of a URL related to a file and not URL-encoded. The character string shown in FIG. 5A includes a character C4 and a character string C5, as characters that need URL-encoding. Specifically, the character C4 is a half-width plus sign and the character string C5 is a character string expressed by Chinese characters.

It is now assumed that the post acquisition unit 111 acquires the URL shown in FIG. 5A, which is a URL that is not URL-encoded at all. In this case, since the character C4 and the character string C5 are not URL-encoded, the file acquisition unit 112 fails in the acquisition of the file using the character string of the URL shown in FIG. 5A. Therefore, the encode processing unit 113 carries out URL-encoding of the encodable characters except "+", which is the encode-on-hold character, in the character string shown in FIG. 5A, as the first encode processing. Thus, the character string C5 is URL-encoded to a character string E5 and a character string shown in FIG. 5B is acquired.

Figure 5D:
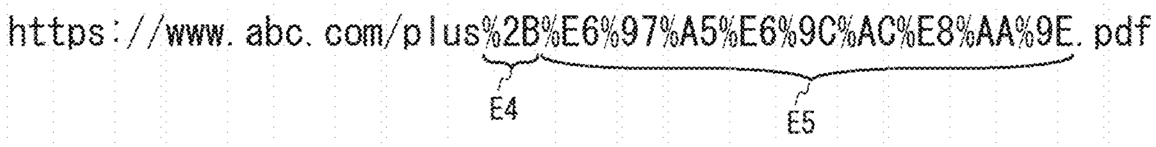
FIG. 5D shows an example of a processing result of second encode processing.

Since the character C4, which needs URL-encoding, is not URL-encoded in the character string shown in FIG. 5B, the file acquisition unit 112 fails in the acquisition of the file indicated by the character string shown in FIG. 5B. This is because the character string shown in FIG. 5B, when decoded, becomes a URL shown in FIG. 5C and is different from the URL shown in FIG. 5A. As such, the encode processing unit 113 carries out the second encode processing on the character string shown in FIG. 5B. Specifically, the encode processing unit 113 carries out URL-encoding of the character C4, which is not a target of encode processing in the first encode processing, in the character string shown in FIG. 5B. Specifically, this processing is performed by character replacement processing according to the encoding rules. Thus, the character C4 is URL-encoded to a character string E4 and a character string shown in FIG. 5D is acquired. In the character string shown in FIG. 5D, both the character C4 and the character string C5 are properly URL-encoded. Therefore, when the character string shown in FIG. 5D is decoded, the character string shown in FIG. 5A is acquired. Thus, when attempting to acquire the file, using the character string shown in FIG. 5D, the file acquisition unit 112 succeeds in the acquisition of the file.

Figure 6:
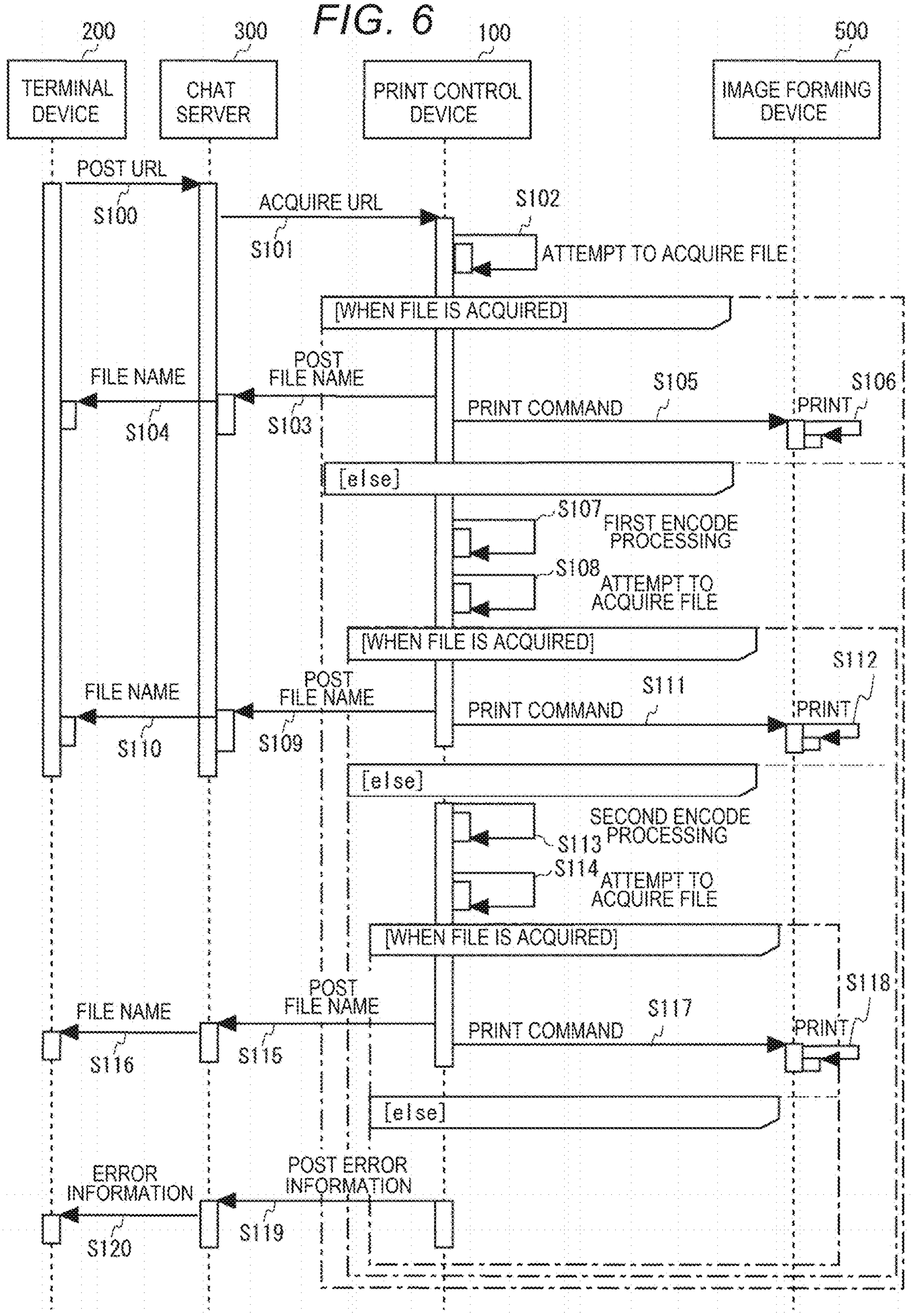
FIG. 6 is a sequence chart showing a flow of operations of the information processing system according to the embodiment.

FIG. 6 is a sequence chart showing a flow of operations by the information processing system 10. The flow of operations by the information processing system 10 will now be described with reference to FIG. 6.

In step S100, in response to an operation by the user U, the terminal device 200 posts the URL of a file to be printed, in the chat room provided by the chat server 300. In response to this, in step S101, the post acquisition unit 111 of the print control device 100 acquires the URL posted in the chat room, from the chat server 300.

Next, in step S102, the file acquisition unit 112 attempts to acquire the file indicated by the URL acquired in step S101. When the file is acquired, that is, when the acquisition of the file is successful, the processing from step S103 to step S106 is performed. In step S103, the posting unit 114 of the print control device 100 posts the file name of the file acquired in step S102, in the chat room. Thus, in step S104, the file name is displayed on the terminal device 200. In step S105, the print control unit 115 of the print control device 100 outputs a print command for the file acquired in step S102. Thus, in step S106, the image forming device 500 prints the file.

When the file cannot be acquired in step S102, that is, when the acquisition of the file fails, the processing from step S107 onward is performed. In step S107, the encode processing unit 113 of the print control device 100 performs the foregoing first encode processing on the URL acquired in step S101. That is, the encode processing unit 113 encodes the encodable characters except a predetermined encode-on-hold character in the character string of the URL acquired in step S101. Then, in step S108, the file acquisition unit 112 of the print control device 100 attempts to acquire the file indicated by the URL acquired as the result of the processing of step S107. When the file is acquired, that is, when the acquisition of the file is successful, the processing from step S109 to step S112 is performed.

In step S109, the posting unit 114 of the print control device 100 posts the file name of the file acquired in step S108, in the chat room. Thus, in step S110, the file name is displayed on the terminal device 200. In step S111, the print control unit 115 of the print control device 100 outputs a print command for the file acquired in step S108. Thus, in step S112, the image forming device 500 prints the file.

When the file cannot be acquired in step S108, that is, when the acquisition of the file fails, the processing from step S113 onward is performed. In step S113, the encode processing unit 113 of the print control device 100 performs the foregoing second encode processing on the URL acquired in step S107. That is, the encode processing unit 113 encodes the encode-on-hold character, which is not a target of encode processing in the first encode processing of step S107. Then, in step S114, the file acquisition unit 112 of the print control device 100 attempts to acquire the file indicated by the URL acquired as the result of the processing of step S113. When the file is acquired, that is, when the acquisition of the file is successful, the processing from step S115 to step S118 is performed.

In step S115, the posting unit 114 of the print control device 100 posts the file name of the file acquired in step S114, in the chat room. Thus, in step S116, the file name is displayed on the terminal device 200. In step S117, the print control unit 115 of the print control device 100 outputs a print command for the file acquired in step S114. Thus, in step S118, the image forming device 500 prints the file.

When the file cannot be acquired in step S114, that is, when the acquisition of the file fails, the processing of steps S119 and S120 is performed. In step S119, the posting unit 114 of the print control device 100 posts error information in the chat room. Thus, in step S120, the error information is displayed on the terminal device 200.

In the above sequence chart, the print control unit 115 immediately causes the image forming device 500 to print the file when the file is acquired, but the print control unit 115 may wait for a print instruction from the user checking the file name of the acquired file and then may cause the image forming device 500 to execute the printing. That is, the print control unit 115 may cause the image forming device 500 to execute the printing of the acquired file when the post acquisition unit 111 acquires the print instruction posted in the chat room after the posting unit 114 posts the file name. Thus, the user can give an instruction to execute the printing after checking the file name and therefore the convenience for the user is improved.

An embodiment has been described above. According to this embodiment, when the file indicated by the posted URL cannot be acquired, the foregoing first encode processing is performed. Therefore, encode processing is properly performed, excluding a character that may be doubly encoded. When the file cannot be acquired even then, the second encode processing is performed. Thus, encode processing is performed on the character that is not encoded in the first encode processing, and a proper URL to acquire the file can be acquired. In this way, according to this embodiment, even when a character string that is not properly URL-encoded is posted as a URL, the file to be printed can be acquired and therefore the convenience for the user is improved.

While an embodiment has been described above, the present disclosure is not limited to the above embodiment and suitable changes can be made without departing from the spirit and scope of the present disclosure.

A part or the entirety of the above embodiment can be described as in the following appendices but is not limited thereto.

APPENDIX 1

A print control device includes: a post acquisition unit configured to acquire a first URL posted in a chat room; a file acquisition unit configured to acquire a file; an encode processing unit configured to encode an encodable character; and a print control unit configured to cause an image forming device to execute printing of the acquired file, wherein the encode processing unit encodes an encodable character except a predetermined character in a character string of the first URL when the file acquisition unit cannot acquire a file indicated by the first URL, and the file acquisition unit acquires a file indicated by a second URL formed by encoding the encodable character except the predetermined character in the character string of the first URL, when unable to acquire file indicated by the first URL.

APPENDIX 2

In the print control device according to Appendix 1, the encode processing unit encodes the predetermined character in the character string of the second URL when the file acquisition unit cannot acquire the file indicated by the second URL, and the file acquisition unit acquires a file indicated by a third URL formed by encoding the predetermined character in the character string of the second URL, when unable to acquire the file indicated by the second URL.

APPENDIX 3

In the print control device according to Appendix 2, the encode processing unit does not encode the predetermined character when a character string made up of the predetermined character and a character following the predetermined character corresponds to a predetermined pattern.

APPENDIX 4

The print control device according to one of Appendices 1 to 3 includes a posting unit configured to post error information in the chat room when a file to be printed cannot be acquired.

APPENDIX 5

The print control device according to one of Appendices 1 to 4 includes a posting unit configured to post a file name of a file to be printed, in the chat room, when the file is acquired.

APPENDIX 6

In the print control device according to Appendix 5, the print control unit causes the image forming device to execute the printing of the acquired file when the post acquisition unit acquires a print instruction posted in the chat room after the file name is posted.

APPENDIX 7

A print control method includes: acquiring a first URL posted in a chat room; acquiring a file; encoding an encodable character; and causing an image forming device to execute printing of the acquired file, wherein an encodable character except a predetermined character in a character string of the first URL is encoded when a file indicated by the first URL cannot be acquired, and a file indicated by a second URL formed by encoding the encodable character except the predetermined character in the character string of the first URL is acquired when the file indicated by the first URL cannot be acquired.

APPENDIX 8

A non-transitory computer-readable storage medium storing a program is provided, the program causing a computer to execute: acquiring a first URL posted in a chat room; acquiring a file; encoding an encodable character; and causing an image forming device to execute printing of the acquired file, wherein in the encoding, an encodable character except a predetermined character in a character string of the first URL is encoded when a file indicated by the first URL cannot be acquired in the acquiring the file, and in the acquiring the file, a file indicated by a second URL formed by encoding the encodable character except the predetermined character in the character string of the first URL is acquired when the file indicated by the first URL cannot be acquired.

What is claimed is:

1. A print control device comprising:

a post acquisition unit configured to acquire a first URL posted in a chat room;

a file acquisition unit configured to acquire a file;

an encode processing unit configured to encode an encodable character; and a print control unit configured to cause an image forming device to execute printing of the acquired file, wherein the encode processing unit encodes an encodable character except a predetermined character in a character string of the first URL when the file acquisition unit cannot acquire a file indicated by the first URL, and the file acquisition unit acquires a file indicated by a second URL formed by encoding the encodable character except the predetermined character in the character string of the first URL, when unable to acquire the file indicated by the first URL.

2. The print control device according to claim 1, wherein the encode processing unit encodes the predetermined character in the character string of the second URL when the file acquisition unit cannot acquire the file indicated by the second URL, and the file acquisition unit acquires a file indicated by a third URL formed by encoding the predetermined character in the character string of the second URL, when unable to acquire the file indicated by the second URL.

3. The print control device according to claim 2, wherein the encode processing unit does not encode the predetermined character when a character string made up of the predetermined character and a character following the predetermined character corresponds to a predetermined pattern.

4. The print control device according to claim 1, comprising:

a posting unit configured to post error information in the chat room when a file to be printed cannot be acquired.

5. The print control device according to claim 1, comprising:

a posting unit configured to post a file name of a file to be printed, in the chat room, when the file is acquired.

6. The print control device according to claim 5, wherein the print control unit causes the image forming device to execute the printing of the acquired file when the post acquisition unit acquires a print instruction posted in the chat room after the file name is posted.

7. A print control method comprising:
acquiring a first URL posted in a chat room;
acquiring a file;
encoding an encodable character; and
causing an image forming device to execute printing of the acquired file, wherein
an encodable character except a predetermined character in a character string of the first URL is encoded when a file indicated by the first URL cannot be acquired, and
a file indicated by a second URL formed by encoding the encodable character except the predetermined character in the character string of the first URL is acquired when the file indicated by the first URL cannot be acquired.

8. A non-transitory computer-readable storage medium storing a program, the program causing a computer to execute:
acquiring a first URL posted in a chat room;
acquiring a file;
encoding an encodable character; and
causing an image forming device to execute printing of the acquired file, wherein
in the encoding, an encodable character except a predetermined character in a character string of the first URL is encoded when a file indicated by the first URL cannot be acquired in the acquiring the file, and
in the acquiring the file, a file indicated by a second URL formed by encoding the encodable character except the predetermined character in the character string of the first URL is acquired when the file indicated by the first URL cannot be acquired.

* * * * *